United States Patent [19]

Hölter et al.

[11] 4,335,708
[45] Jun. 22, 1982

[54] SOLAR COLLECTOR

[75] Inventors: Heinz Hölter, Beisenstrasse 39-41, 4390 Gladbeck; Heinz Gresch, Dortmund-Derne; Heinrich Igelbüscher, Gladbeck, all of Fed. Rep. of Germany

[73] Assignee: Heinz Hölter, Gladbeck, Fed. Rep. of Germany

[21] Appl. No.: 22,382

[22] Filed: Mar. 21, 1979

[30] Foreign Application Priority Data

Apr. 26, 1978 [DE] Fed. Rep. of Germany ....... 2818154
Jan. 29, 1979 [DE] Fed. Rep. of Germany ....... 2903220

[51] Int. Cl.³ ............................................. F24J 3/02
[52] U.S. Cl. .................................... 126/442; 126/417; 126/444; 126/449
[58] Field of Search ............... 126/417, 449, 444, 446, 126/450, 432, 442; 165/170, 485

[56] References Cited

U.S. PATENT DOCUMENTS

| 201,439 | 3/1878 | Moreau | 126/449 |
|---|---|---|---|
| 2,427,262 | 9/1947 | Delano | 126/426 X |
| 3,129,703 | 4/1964 | Tabor | 126/446 |
| 3,303,838 | 2/1967 | Thomason | 126/432 |
| 3,613,659 | 10/1971 | Phillips | 126/438 X |
| 4,129,117 | 12/1978 | Harvey | 126/449 X |
| 4,136,672 | 1/1979 | Hallanger | 126/432 |

FOREIGN PATENT DOCUMENTS 2629086  6/1976  Fed. Rep. of Germany ...... 126/449

Primary Examiner—Larry Jones
Attorney, Agent, or Firm—James C. Wray

[57] ABSTRACT

Solar collectors have flat plate-like foil tubes with permeable interlayers with lattice structure surfaces bonded to the foils of the tube. Several tubes with insulating backing are seam bonded together to form a sheet for covering a roof. Heat transfer medium flows from inlets into a space along one side of the tube, through the permeable interlayer into a space along the other side of the tube and through an outlet. The structure is thin, light, inexpensive and easy to install. Flow of medium which covers substantially all of a surface may be precisely controlled. Temperature of medium in the collectors may be maintained only slightly higher than temperatures throughout the system.

15 Claims, 5 Drawing Figures

SOLAR COLLECTOR

The invention provides a solar collector to absorb solar energy with at least one collector tube with an inlet and an outlet for flow of a heat-transport medium.

Such solar collectors are installed in areas exposed to solar energy such as roofs of houses, and are connected to a heat-transportation circuit mainly consisting of a collector heat exchanger and a collector pump. Known solar collectors use systems of tubes, especially glass tubes for flow of the heat-transport medium exposed to the solar radiation. Such systems are relatively expensive to manufacture and maintain. Besides, disadvantageously, tubes of known solar collectors cover only portions of the areas exposed to solar radiation, requiring an additional expedient of transferring solar energy from absorber plates to the tubes.

The object of the invention is to provide a solar collector which is simple to produce as well as easy to install and to maintain.

The answer is a solar collector of the type as earlier described, characterized by at least one flat plate-like foil tube, where between the walls of the foils permeable interlayer for the heat-transporting medium is installed.

The special solar collectors have elongated rectangular configurations and are made of relatively moderate priced materials. It is understood that the upper tube wall exposed to the solar radiation of the solar collector has to consist of a layer transparent to the solar radiation. The lower tube wall at the back of the solar collector can consist of the same material with an additional insulation layer attached, or the lower tube wall itself at the back of the solar collector can be made of material to reduce heat losses. In any case, the heat-transport medium, for example water, can flow through the flat plate-like foil tube, because the interlayer is permeable. This interlayer not only produces a desired space between the thin foils, but also defines a desired flow resistance for the heat-transport medium, which can flow through the solar collector at a predetermined velocity. The interlayer can be kept very thin so that the material consumption is also relatively low. In particular, the thickness of this interlayer can vary from 1 to 3 millimeters. Therefore, the solar collector including the heat-transport medium is of relatively low weight. If installed on a roof, this solar collector will impose only little additional load to the roof construction of a house. With regard to the functioning of the system, it is advantageous that the absorbed heat will be directly transferred to the heat-transport medium over the complete area exposed to the radiation. Therefore, the system proportions can be regulated in such a way that the temperature of the absorbing layer is only insignificantly higher than the temperature of the heat-transport medium. Among other things, this will reduce the stress and strain of the roof structure, if the solar collector is an integral part of it.

It is practical that the interlayer extends only partially over the width of the flat plate-like foil tube, thus forming on both sides of this interlayer channels, which are connected to the inlet and outlet. By that means an equal flow distribution of the heat-transport medium can be achieved when entering and leaving the interlayer.

The interjacent layer can consist of a foam or fibrous material, a felt or a fleece-like material.

It is recommended that the walls of the foil tube be tightly bonded to the sides of the interlayer, particularly by thermal fusion. This represents technical advantages during assembly, and it also guarantees that, during long term operation of the system, the interlayer cannot change its position in relation to the foil layers.

To avoid partial or total damage to functioning and permeability of the inner layer, which damage may be caused by excessive heat development during thermal fusion of the foils to the interlayer, surface areas of the interlayer which are exposed to the foils should have a compacted structure. In particular, the sides of the interjacent layer exposed to the foils can be reinforced with a protective layer made of webbed texture. It is possible to use a texture consisting of a lattice structure so that the interjacent layer is fused to the foils only in certain areas. It is then possible to use large-pore foam materials, felts or fleece with advantageous flow properties, especially low flow resistance.

To manufacture such a solar collector or collector element, an extruder can be used by directing through a special nozzle of the extruder, a foam or fibrous material together with webbed texture-like protective surfaces on both sides. The synthetic material flat plate-like foil tube being prepared in the extruder will be thermally fused to those protective surfaces using compaction by rolling or calendering.

The flat plate-like foil tube can be made of different foil layers fused together by thermal seam-welding.

To produce a large plate-like solar collector, several of the solar collector elements can be fused together in array by thermal seam-welding. Such a panel-like or mat-like solar collector is easy and smooth to install, without folds.

Therefore, this new solar collector can be all or at least a part of the roof cladding of a building. For that purpose, on the back of solar collector, not exposed to the solar radiation, an insulation layer can be arranged. The back side of this insulation layer can have an adhesive layer for easy mounting on a sheathing of a roof.

If the solar collector should be installed on a flat roof or roofs with a low pitch, it is practical that the side exposed to the solar radiation consists of a profiled, particularly a saw-toothed or serrated surface, where the profiles are arranged respectively tilted in such a way that the solar collector is more or less perpendicular to the solar radiation. Preferably each solar collector element is provided with such profiled, i.e. several of these saw-toothed forms. The solar collector can be assembled of several collector elements, being triangular in cross-section, hence defining such a saw-tooth.

In the following the invention is explained in more detail using the attached drawings.

Figure 1:
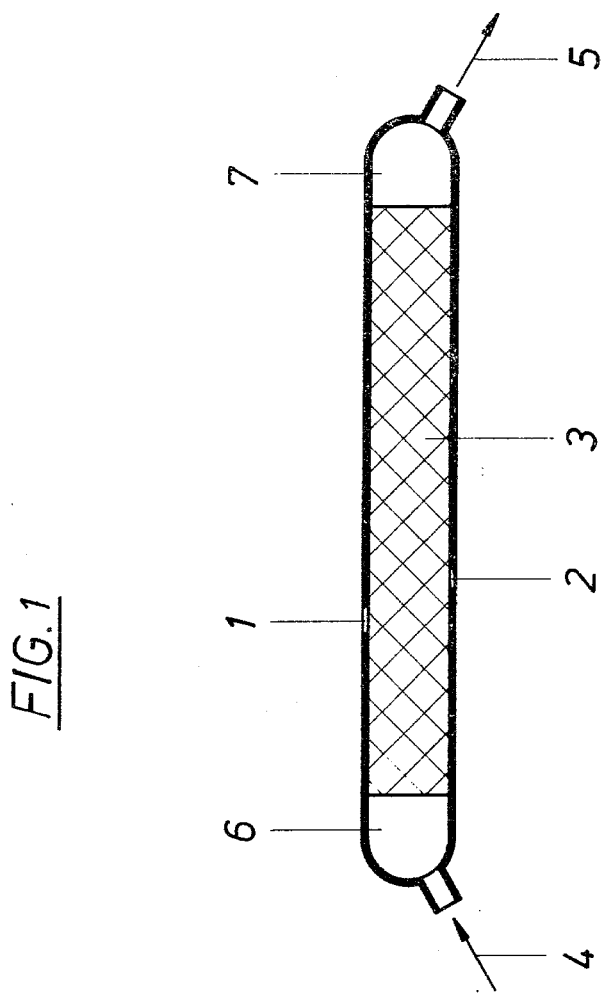
FIG. 1 is a schematic cross-section of a solar collector.

The solar collector illustrated on FIG. 1 consists of a flat plate-like foil tube with an upper tube wall 1, and a lower tube wall 2, with an interlayer 3, which is permeable to the heat transport medium flowing through the collector. The solar collector has on one side an opening 4 for the inlet and on the other side an opening 5 for the outlet of the heat-transport medium. Both inlet 4 and outlet 5 are connected to a heat-transportation circuit not shown on this drawing. As can be seen on FIG. 1, the interlayer 3 extends only partially over the width of the solar collector, forming channels 6 and 7 on sides of the interlayer 3. Those channels are connected to the inlet 4 and outlet 5. The heat-transport medium enters the solar collector through the inlet 4, is distributed equally along the channel 6, then flows through the interlayer 3, collects in channel 7 on the other side, and leaves the collector through the outlet 5.

The interlayer, with a thickness of only 1 to 3 mm consists of a foam or fibrous material with open pores. In that way the heat-transport medium experiences only a relatively low flow resistance. At the same time, the heat-transport medium is equally distributed over the whole area of the solar collector so that a maximum of the solar energy absorbed by the foil can be transferred. By regulating the flow velocity of the heat-transport medium, it can be achieved that the surface temperature of the solar collector is only little higher than the temperature of the heat-transport medium, and, accordingly, radiation losses can be kept low.

Figure 2:
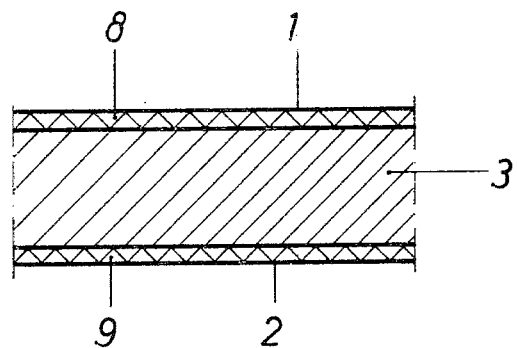
FIG. 2 is a partial schematic cross-section of another type of a solar collector.

It is understood that the upper tube wall 1 consists of a material transparent to solar radiation. The lower tube wall 2 can consist of the same material with an additional insulation layer (not shown) attached at the back of this wall 2 to reduce heat losses. It is also possible that the lower tube wall 2 itself be made of an insulated material. The walls 1 and 2 of the foils are tightly bonded to the respective sides of the interlayer 3. In particular, foils are thermally welded to the interlayer 3. To avoid damage of the relatively thin interlayer 3 during fusion, which could result in loss of permeability and therefore in loss of proper functioning, this interlayer 3 is constructed in a special way. The surface zones of the interjacent layer 3, exposed to the upper and lower walls 1 and 2 have a compacted structure. As shown in FIG. 2, respective sides of the layer 3 are reinforced with a webbed texture, forming protective layers 8 and 9, respectively. In particular, the web consists of a lattice structure. During thermal fusion of the walls 1 and 2 with the foils, protective layers 8 and 9 protect interlayer 3 against undue heat which could be detrimental to permeability.

Figure 3:
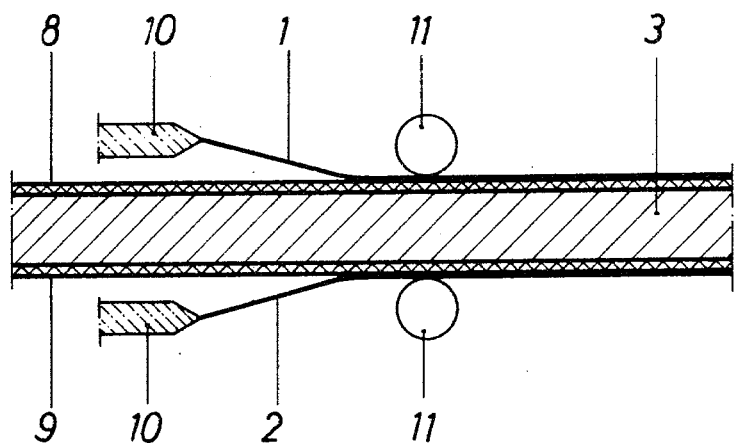
FIG. 3 is a schematic for the manufacturing of such a solar collector or collector element according to FIG. 2.

FIG. 3 illustrates in a schematic how such a solar collector can be manufactured using an extruder 10. The extruder 10 has a special nozzle through which is directed the interlayer 3 already provided with protective layers 8 and 9. The synthetic material, prepared in the extruder, will be extruded as upper wall 1 and lower wall 2, respectively. Edges of upper and lower walls 1 and 2 are tightly fused together with the protective layers 8 and 9 with the help of a calender 11.

Especially, by using a lattice structure as the protective layers 8 and 9, a tight connection between the walls 1 respectively 2 and the protective layers 8 and 9 can be achieved, whereby the actual interlayer 3 is not impaired in its function or destroyed during the thermal welding procedure. Such an assembled solar collector has, because of the compacted structure in the area of the protective layers 8 and 9, a propitious stiffness to allow easy and smooth installation and assembly of the solar collector without folds.

Figure 4:
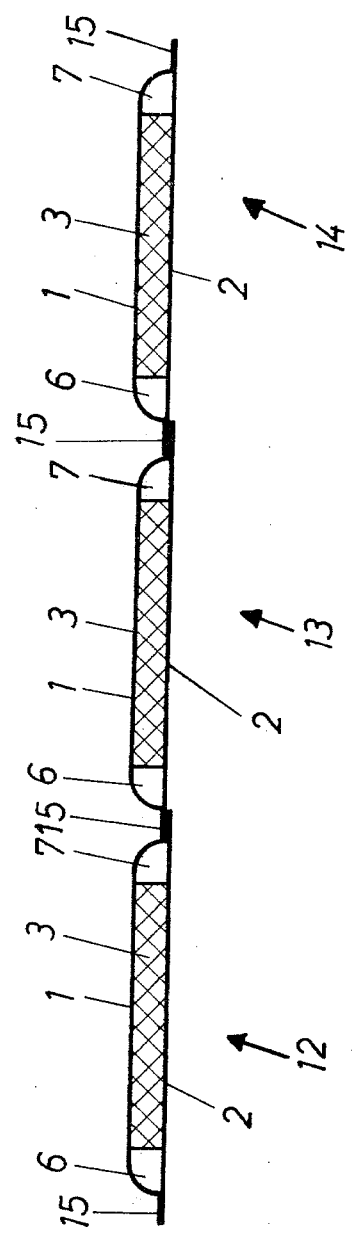
FIG. 4 is a schematic cross-section of a solar collector consisting of several collector elements installed in array.

FIG. 4 shows that the solar collector can consist of several collector elements 12, 13 and 14. Each of these collector elements are of the type presented on FIGS. 1 and 2. The collector elements 12, 13 and 14 consist of two foil layers forming the upper tube wall 1 and the lower tube wall 2. The two foil layers 1 and 2 are fused by thermal seam-welding. It can be seen that neighboring collector elements 12 and 13 and, respectively, 13 and 14 are also fused by thermal welding at seams 15. In that way, a relatively large mat-like solar collector is formed which is suitable to be installed on roofs as part of the integral roof structure. For that purpose an insulation layer—not shown on the drawings—can be bonded to the back of the solar collector. The back side of this insulation layer can have an adhesive or bonding layer for easy mounting, for example on a sheathing of a roof.

Figure 5:
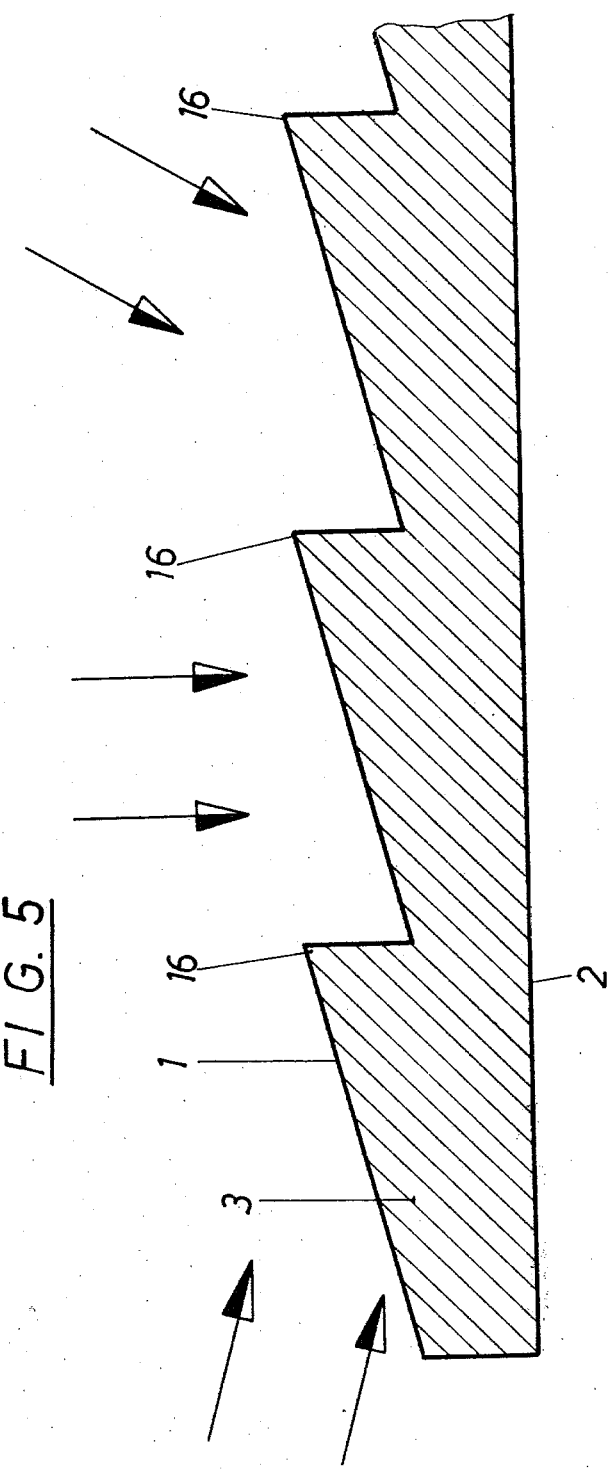
FIG. 5 is a schematic of another type of a solar collector.

FIG. 5 shows a cross-section of a solar collector with a profiled surface. The surface of the solar collector consists of several rows of mainly parallel running ribs 16 with a saw-toothed cross-section. Their tilt angle is chosen in such a way that for any given location the largest part of the surface of the solar collector is roughly perpendicular to the sun's rays to absorb a maximum of the solar radiation. This arrangement is especially suitable for solar collectors to be installed on roofs with a low pitch or on flat roofs.

We claim:

1. Solar collector to absorb solar energy with at least one collector tube with an inlet and an outlet for a heat-transport medium characterized by at least one flat plate-like foil tube, an interlayer which is permeable to the heat-transport medium installed inside walls of the foil tube, the interlayer extending only partially over a width of the flat plate-like foil tube thus forming on both sides of the interlayer channels which respectively are connected to an inlet and an outlet, sides of the interlayer exposed to the walls of the foil tube being reinforced with webbed texture protective layers, and a wall exposed to solar radiation having a profiled sawtoothed surface.

2. Solar collector to absorb solar energy with at least one collector tube with an inlet and an outlet for a heat-transport medium characterized by at least one flat plate-like foil tube having a heat permeable outer wall and an interlayer which is permeable to the heat-transport medium installed inside the walls of the foil tube, the wall exposed to the solar radiation consisting of a profiled, particularly a saw-toothed surface.

3. Solar collector to absorb solar energy with at least one collector tube with an inlet and an outlet for a heat-transport medium characterized by at least one flat plate-like foil tube having a heat permeable outer wall and an interlayer which is permeable to the heat-transport medium installed inside the walls of the foil tube characterized by an insulation layer being arranged on the rear side of the solar collector which is not exposed to the solar radiation and the rear side of the insulation layer having an adhesive or bonding layer for easy mounting, for example on a sheathing of a roof.

4. Solar collector according to claim 3 or 2, thus characterized that the interlayer extends only partially over a width of the flat plate-like foil tube thus forming on both sides of the interlayer channels which respectively are connected to an inlet and an outlet.

5. Solar collector according to claims 3 or 2, thus characterized that the interlayer consists of a foam material with open pores.

6. Solar collector according to claims 3 or 2, thus characterized that the interlayer consists of a fibrous material.

7. Solar collector according to claims 3 or 2, thus characterized that the walls of the foils are tightly bonded to the respective sides of the interlayer.

8. Solar collector according to claim 7, thus characterized that the walls of the foils are thermally welded to the respective sides of the interlayer.

9. Solar collector according to claims 3 or 2, thus characterized that the surface zones of the interlayer which are exposed to the walls of the foil tube have a compact structure.

10. Solar collector according to claims 3 or 2, thus characterized that the sides of the interlayer exposed to the walls of the foil tube are reinforced with protective layers.

11. Solar collector according to claim 10, thus characterized that the protective layers consist of a webbed texture.

12. Solar collector according to claim 11, thus characterized that the webbed texture is of a lattice structure.

13. Solar collector according to claims 3 or 2, thus characterized that the flat plate-like foil tube is formed of several foil layers fused together by thermal seam-welding.

14. Solar collector according to claims 3 or 2, thus characterized that several collector tubes are arranged in array by thermal seam-welding.

15. Solar collector according to claim 2, characterized by an insulation layer arranged on the rear side of the solar collector which is not exposed to the solar radiation.

* * * * *